United States Patent [19]
Yata et al.

[11] 3,967,056
[45] June 29, 1976

[54] AUTOMATIC FOCUSING APPARATUS

[75] Inventors: Kotaro Yata, Ikeda; Seiji Yamada, Sakai, both of Japan

[73] Assignee: Minolta Camera Kabushiki Kaisha, Osaka, Japan

[22] Filed: Feb. 19, 1974

[21] Appl. No.: 443,527

[30] Foreign Application Priority Data
Feb. 26, 1973  Japan.............................. 48-22936
Feb. 27, 1973  Japan.............................. 48-24994

[52] U.S. Cl............................ 178/7.2; 178/DIG. 29
[51] Int. Cl.²............................................. H04N 5/38
[58] Field of Search....... 178/7.2, DIG. 27, DIG. 29, 178/7.92, 7.1; 355/55, 56; 354/25, 195

[56] References Cited
UNITED STATES PATENTS
3,211,831  10/1965  Steiner........................ 178/DIG. 29
3,356,792  12/1967  Peters.......................... 178/DIG. 29
3,555,280   1/1971  Richards....................... 178/DIG. 29

*Primary Examiner*—George H. Libman
*Assistant Examiner*—R. John Godfrey
*Attorney, Agent, or Firm*—Wenderoth, Lind & Ponack

[57] ABSTRACT

An automatic focusing apparatus for use in a photographic or television camera having a lens system movable in predetermined incremental displacements in relation to a subject to be photographed in search of the true focus setting. A scanner is provided for scanning the image of the subject and for generating a serial video signal indicative of the image of the subject. This serial video signal is processed by maximum and minimum value detectors which generate signals indicative of the maximum and minimum values of the serial video signal to an extreme value detector through a difference detector. Output from the extreme value detector indicates that the image of the subject is focused in the image plane.

4 Claims, 32 Drawing Figures

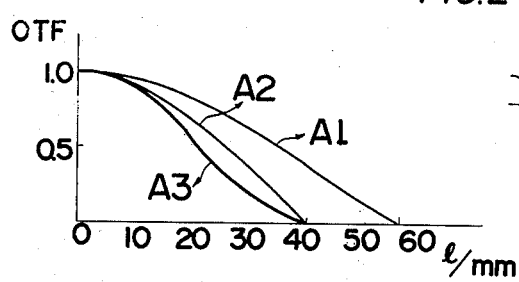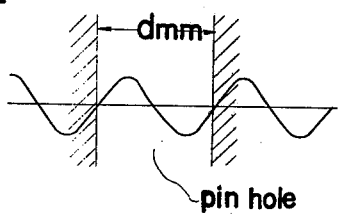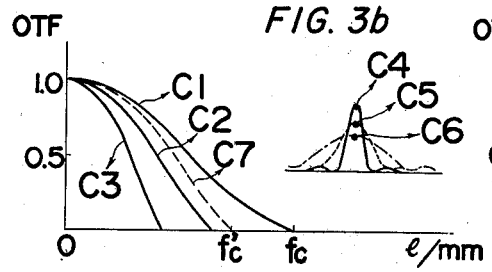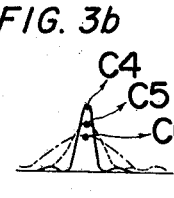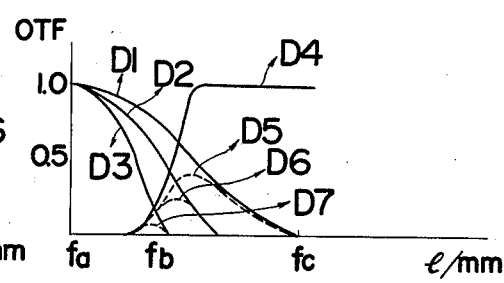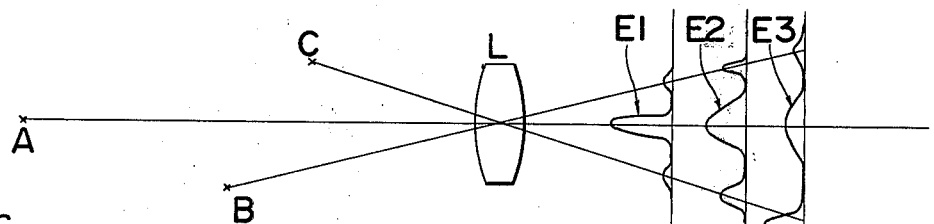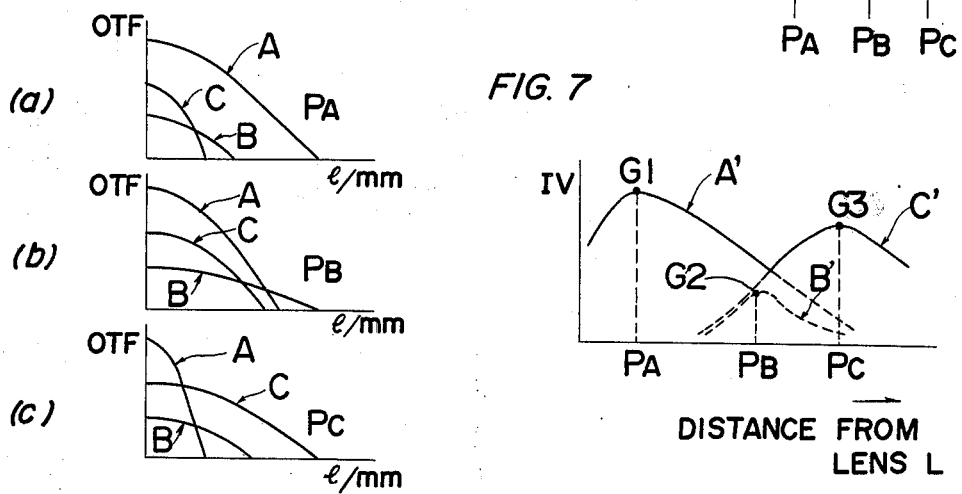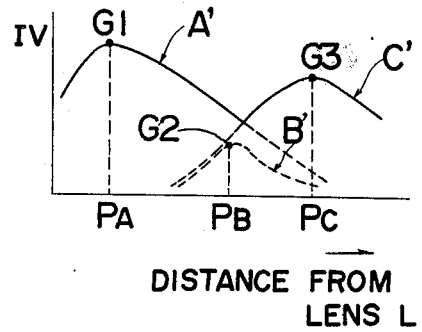

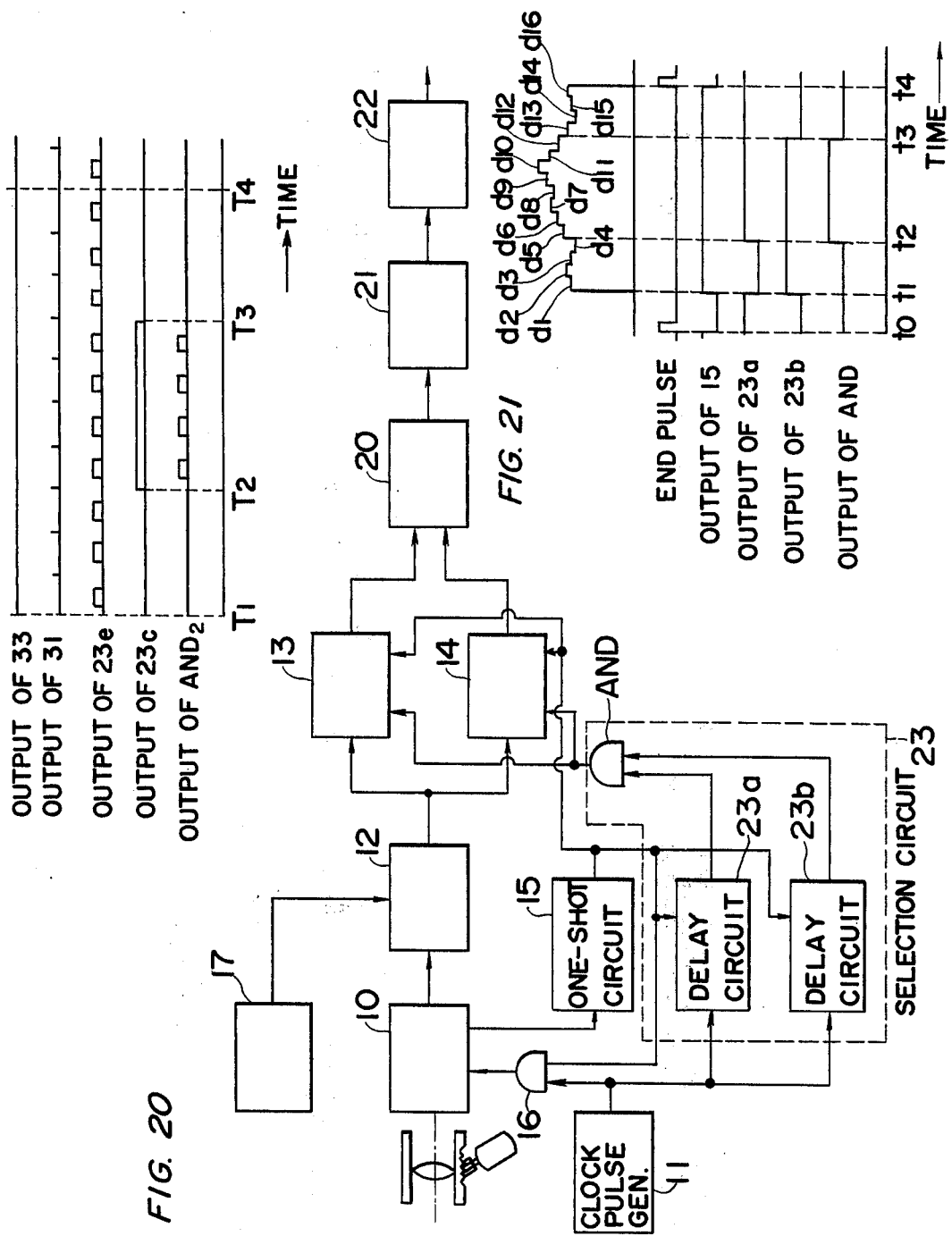

AUTOMATIC FOCUSING APPARATUS

BACKGROUND OF THE INVENTION

The present invention relates to an automatic focusing device suitable for use in a photographic or television camera having an objective lens assembly axially movable in predetermined incremental displacements in search of the true focus setting in relation to the subject to be photographed, and a method therefor.

According to a prior art focusing system, employed in a photographic camera, a scanning device is employed for scanning an image of the subject to be photographed (hereinafter referred to as a target subject) that has been projected through the objective lens assembly of the camera onto an image plane which essentially corresponds to, or is an equivalent to, the plane where a light sensitive film is placed. The scanning device referred to above comprises a combination of a photo-transducer and a mechanical interceptor in the form of either a slit or a pin hole formed in a rotatable disc which is located in front of the photo-transducer.

In this prior art focusing system, automatic focusing is carried out in such a way that a serial video signal indicative of the image of the target subject, that has emerged from the photo-transducer, is differentiated to give an indication, depending on the value of the differentiated signal, whether or not the image of the target subject is focused in the image plate. The true focus setting can be achieved by varying the distance between the objective lens assembly and the image plane in such a way as to increase the level of the differentiated signal to an extreme value and, at the time the differentiated signal attains the extreme value, the image of the target subject is considered exactly focused in the image plate.

The employment of a multi-cell photo-transducer, such as a self-scanning photo-diode array or image sensor array, having a plurality of transducer elements, electirically connected either in a linear arrangement or in a matrix arrangement, is possible in place of the combined photo-transducer and interceptor. As is well known to those skilled in the art, the multi-cell phototransducer has a built-in shift register and self-scans in such a way that the transducer elements are sequentially brought into operation in response to clock pulses applied thereto through the shift register.

The transducer elements of the multi-cell transducer are sequentially brought into operation to scan the image of the target subject in a substantially similar way as the combined transducer and interceptor does and, therefore, each transducer element of the multi-cell transducer may be considered as corresponding to the slit or pin hole of the mechanical interceptor. In view of the foregoing, for the sake of convenience, the term "unitary light receptor (of the scanner)" hereinafter employed should be understood as intended to include any one of the transducer elements of the multi-cell transducer and the slit or pin hole of the interceptor.

In the arrangement of the prior art focusing system, referred to above, the scanner is designed such as to detect a relatively high component of the spatial frequency of the image of the target subject and, therefore, it has often been found that focusing of an image of the target subject which is composed of a relatively low spatial frequency, i.e., of the target subject having a blurring contrast, is hardly performed. Moreover, detection of the relatively high spatial frequency for focusing essentially requires a decrease of the size of a unitary light receptor of the scanner employed, but practice has shown that the extent to which the size of the unitary light receptor can be reduced is limited. In other words, the smaller the size of the unitary light receptor, the lower the output energy from the unitary light receptor and, therefore, the time response characteristic thereof is so lowered that the focusing system can not be practically employed in a photographic camera which is often used in taking pictures of dark target subjects.

In addition, so far as focusing in relation to a target subject having depth and brightness distribution is concerned, the prior art system often fails to determine a definite focus position and sometimes, focusing of a selected area of the target subject in the image plane is settled down in relation to one of the other areas of the target subject which are relatively close to the selected area. Therefore, this also constitutes one of the major reasons for reduction of practical availability of the prior art system.

OBJECTS OF THE INVENTION

Accordingly, an essential object of the present invention is to provide an automatic focusing device capable of focusing an image of the target subject on the image plane with substantial elimination of the disadvantages inherent in the prior art focusing system of a similar kind.

Another object of the present invention is to provide an automatic focusing device wherein substantially the entire range of spatial frequencies is included in the image of the target subject is assessed in determining that the image is focused in the image plane.

A further object of the present invention is to provide an automatic focusing device which can be used in any type of commercially available cameras in search of the true focus setting relative to the target subject due to the fact that the arrangement is designed to detect the highest point of contrast of an image of a portion of the target subject which has a relatively high brightness.

A still further object of the present invention is to provide an automatic focusing device wherein the size of the unitary light receptor of the scanning device can be larger than that employed in the aforesaid prior art focusing device, with substantial improvement in the energy responsibility and, consequently, the time response characteristic.

A still further object of the present invention is to provide an automatic focusing device wherein a beam of light carrying an image of the target subject is converted into a serial video signal which is subsequently processed in search of the true focus setting relative to the target subject.

A still further object of the present invention is to provide an automatic focusing device wherein means are provided to axially move an objective lens assembly of a photographic camera in predetermined displacements in such a way as to attain the extreme value of the aforesaid video signal.

A still further object of the present invention is to provide an automatic focusing device which can be manufactured at relatively low costs, is reliable in operation and is capable of accurately focusing an image of the target subject in the image plane.

A related object of the present invention is to provide a method of image focusing which is practiced by the aforesaid automatic focusing device.

BRIEF SUMMARY OF THE INVENTION

According to the present invention, the automatic focusing device includes a scanning device which may be in the form of the multi-cell photo-transducer or in the form of the combined photo-transducer and the mechanical interceptor. The scanning device or scanner scans the image of a target subject, that has been projected on the image plane of an objective lens assembly, to produce a serial video signal indicative of the image scanned. This video signal is then fed both to a maximum value detector and to a minimum valve detector to produce signals indicative of the maximum and minimum values of said video signal, produced during each scanning operation of the scanner, respectively.

A difference or ratio between the maximum and minimum values of the serial video signal is subsequently detected.

The objective lens assembly of the camera equipped with the focusing device of the present invention is axially driven in predetermined incremental displacements each time the scanner scans the image of the target subject and, by repeating the above procedure a number of times corresponding to the number of scans performed by the scanner, a signal indicative of differences or ratios between the maximum and minimum values of the serial video signals is detected as a signal indicative of the position of the focal point of the objective lens assembly relative to the target subject. The true focus setting wherein the focal point of the objective lens assembly locates at the image plane can be attained when said difference or ratio signal attains an extreme value at which time movement of the lens assembly is interrupted.

In general, it is well recognized that an arbitrarily chosen target subject is composed of sine waves of various spatial frequencies. This is evidenced by the Fourier analysis of distribution of intensity of incident light indicative of the image of the target subject. With this in mind, when a beam of light carrying the image of the target subject travels through the lens assembly and then is converted into a serial video signal through the scanner, the sine wave amplitude of each spatial frequency component of the target subject is more or less reduced by the transfer characteristic of one or both of the lens assembly and the scanner, decaying the contrast of the sine wave distribution. This transfer characteristic of the lens assembly and the scanner herein above referred to is a function of the spatial frequency of the target subject to be focused in the image plane and is generally referred to as the optical transfer function. As is well known to those skilled in the art, the optical transfer function is a term used to describe capability of image formation of one particular optical system.

By way of example, a typical optical transfer function of an objective lens assembly of a 35mm. camera and a unitary light receptor of the scanner placed in the image plane of the 35mm. camera is illustrated in FIG. 1, wherein the axis of the abscissa represents the spatial frequency expressed in terms of line pair per milimeter and the axis of the ordinate represents the rate of decay of the contrast that takes place during optical transfer, that is, the value of optical transfer function. In most objective lens assemblies for 35mm. cameras, the contrast of an image of a target subject composed of a spatial frequency of 40 to 60 lines per milimeter remarkably decreases to an approximately zero value. The spatial frequency at which this contrast substantially becomes zero is hereinafter referred to as a cut-off frequency and the optical transfer function of a typical one of the objective lens assemblies gradually decreases as the spatial frequency of the image attains the cut-off frequency as substantially indicated by a curve $A_1$ in FIG. 1.

While the optical transfer function of the typical objective lens assembly, i.e., the optical system of a camera, is such as hereinbefore described, the optical transfer function of, for example, the pin hole forming a part of the scanner will now be described. As shown in FIG. 2, assuming that d represents the size, i.e., diameter, of the pin hole in terms of milimeter, and that this pin hole scans the image of the target subject projected on the image plane, it is evident that a spatial frequency component of more than $(1/d)$ line/mm. cannot be transferred through the pin hole of d mm. in diameter. As can be clarified by a known principle of optical transfer, the optical transfer function of the pin hole of d mm. in diameter has a cut-off frequency of $(1/d)$ line pair per milimeter and, before it is completely decayed at the cut-off frequency, it decreases following a curve represented by a function, sin x/x. A curve $A_2$ shown in FIG. 1 illustrates the rate of decay of the optical transfer function of a pin hole of $25\mu$ in diameter with the cut-off frequency at 40 line pairs per milimeter.

On the other hand, it is well understood that the rate of decay of the total contrast that may take place during transfer of the image through the optical system and conversion of the optical image into an electrical video signal through each of the unitary light receptors of the scanner corresponds to the product of these optical transfer functions of the optical system and the unitary light receptor, which product is hereinafter referred to as total optical transfer function. In other words, the total optical transfer function of the lens assembly whose optical transfer function is represented by the curve $A_1$ and of the pin hole whose optical transfer function is represented by the curve $A_2$ in FIG. 1 can be, therefore, represented by a curve $A_3$ in FIG. 1. The curve $A_3$ corresponds to the case where the image of the target subject is correctly focused in the image plane and, as the image of the target subject is brought out of focus by moving the lens assembly, the total optical transfer function varies as indicated by curves $C_1$, $C_2$ and $C_3$ in FIG. 3($a$). The reason for this variation of the total optical function in such a manner as shown in FIG. 3($a$) is well understood by those skilled in the art.

FIG. 4 illustrates an optical transfer function of the prior art focusing system hereinabove referred to. In FIG. 4, a curve $D_1$ represents the total optical transfer function which is taken when the image of the target subject is correctly focused on the image plane and it gradually varies as indicated by curves $D_2$ and $D_3$ as the once-focused image is brought out of focus upon axial displacement of the lens assembly. In the prior art system wherein the differentiated signal associated with the distribution of image intensity is processed, a high pass filter such as indicated by a curve $D_4$ in FIG. 4 should be electrically formed as a part of the detection system thereof and, therefore, the output from this detection system can be possibly expressed by the product of the curves $D_1$, $D_2$ and $d_3$ and the curve $D_4$, i.e., in terms of curves $D_5$, $D_6$ and $D_7$. From FIG. 4, it is clear that, as the optical system is axially moved to focus the image of the target subject in the image plane, the level of the differentiated signal increases and, when this differentiated signal attains a maximum value, the true focus setting can be achieved. This means that the area defined by each of dotted curves $D_7$, $D_6$ and $D_5$ in cooperation with the axis of the abscissa in FIG. 4 increases, the largest area being that defined by the dotted curve $D_5$ in cooperation with the axis of the abscissa. Accordingly, the prior art focusing system is such that a spatial frequency component within the range of from fb to fc of the total spatial frequencies of the image of the target subject is mainly picked up and, when the contrast, i.e., the optical transfer function, thereof attains a maximum value, the true focus setting can be considered achieved. This type of detecting whether or not the image is focused in the image plane, such as employed in the prior art focusing system, may be possibly said to assess a relatively high component of the spatial frequency and, therefore, as hereinbefore described and as can be understood from FIG. 4, the prior art focusing system cannot satisfactorily function where the image of the target subject of a kind having a relatively low spatial frequency component within the range of from fa to fb is to be focused in the image plane. Furthermore, as can be understood from the curves $A_1$, $A_2$ and $A_3$ in FIG. 1, the cut-off frequency of the light receptor should be equal or close to the cut-off frequency of the optical system in order to render the prior art focusing system capable of generating a signal indicative of the image of the relatively high spatial frequency component. However, to manufacture the optical system and the light receptor having the same or close cut-off frequency cannot be practically carried out and therefore, the prior art focusing system has disadvantages in that the energy sensibility as well as the time response characteristic are relatively low, in that operation thereof is unstable and unreliable and in that it is expensive.

Hereinafter, the principle of the present invention will be described. Assuming first that a point of light is focused in the image plane and the image of the point of light in the image plane is scanned by the scanner, an output from this scanner is represented as shown by a curve $C_4$ in FIG. 3(b). However, as this once-focused image of the light point is brought out of focus, the waveform of the output from the scanner gradually varies as shown by curves $C_5$ and $C_6$ in FIG. 3(b). So far as the optical transfer function is concerned, the curves $C_4$, $C_5$ and $C_6$ respectively correspond to the curve $C_1$, $C_2$ and $C_3$ in FIG. 3(a). It is known that the highest values of the curves $C_4$, $C_5$ and $C_6$ are respectively proportional to the areas which are surrounded by the optical transfer function curves $C_1$, $C_2$ and $C_3$ and the axes of abscissa and ordinate.

Accordingly, to find the maximum value of the video signal obtained by scanning an image of a point of light it is considered necessary to find the integrated value of the optical transfer function all over the entire spatial frequency, said integrated value being referred to as "information volume" in the field of optics. On the contrary thereto, the minimum value of the same video signal is often found in the darkest portion of the image superimposed by a D.C. component present in said portion of focusing area and is constant irrespective of whether or not the image of the target subject is focused in the image plane. Accordingly, the system according to the present invention wherein an arrangement is made to find a difference between the maximum and minimum values of the video signal available during each scanning operation of the scanner to indicate that the image of the target subject is focused in the image plane may be said to be a system wherein the information volume of the total optical transfer function, including the optical transfer function of the objective lens assembly and that of the unitary light receptor of the scanner, within the whole range of spatial frequency is utilized to indicate that the image of the target subject is focused in the image plane. Therefore, in the system according to the present invention, no matter what spatial frequency the target subject has, the image contrast is assessed in the form as including the entire spatial frequency to determine that the image of the target subject is focused in the image plane, thereby substantially eliminating the disadvantages inherent in the prior art system.

The principle of the present invention as applied to an ordinary type of photographic camera which is generally used to take pictures of a target subject having depth and brightness distribution, is as follows. In this description, it is assumed that three points of light A, B and C instead of three target subjects are located at different distances away from the lens assembly L as shown in FIG. 5. It is also assumed that the distance between the light point A and the lens assembly L is greater than that between the light point B and the lens assembly L which is greater than between the light point C and the lens assembly L and that the light point A is brighter than the light point C which is brighter than the light point B. In FIG. 5, $P_A$, $P_B$ and $P_C$ respectively represent planes where conjugate points of the light points A, B and C locate. As shown in FIG. 5, it is understood that the distribution of image intensity of the light points A, B and C in these conjugate planes $P_A$, $P_B$ and $P_C$ are represented by curves $E_1$, $E_2$ and $E_3$. FIGS. 6(a), (b) and (c) illustrate the total optical transfer functions, respectively, which represent conditions of the light points A, B and C focused in the individual conjugate planes $P_A$, $P_B$ and $P_C$, wherein the maximum contrast of the image of the light point A is taken as a value 1. As hereinbefore described, the maximum intensity of each light point is proportional to an information volume defined by the optical transfer function curve corresponding to the associated image. In the example as shown, the highest information volumes on the conjugate planes $P_A$ and $P_C$ respectively belong to the images of the light points A and C. However, in the conjugate plane $P_B$, in view of the fact that the absolute value of brightness of the light point B is the lowest of all, the information volume of the image of the light point B is the smallest of all though the contrast of the image of the light point B does not become zero until it reaches the cut-off frequency. This fact is illustrated in detail in FIG. 7 wherein the axis of the abscissa represents the distance from the lens assembly L to the individual conjugate planes while the axis of the ordinate represents the information volumes of the individual images of the light points A, B and C. As can be understood from FIG. 7, as the distance between the lens assembly L and the image plane varies, the information volume of the image of each of the light points A, B and C correspondingly varies as represented by curves A', B' and C' in FIG. 7. To find a difference between the maximum and minimum values of the video signal obtained from the distribution of image intensity that has been measured by scanning the image of the target subject at a predetermined location, which is the principle of the present invention, is nothing more than to pick up the maximum value of information volumes of images in the image plane to indicate that the image of the target subject is focused in the image plane and, therefore, as the lens assembly is axially moved, a signal, the waveform of which is substantially indicated by a curve in real line in FIG. 7, can be obtained and the peak values G1 and G3 which represent relatively high contrast of the light points A and B respectively, are deemed as extreme values which are used to define the true focus setting. On the other hand, as regards the image of the light point B which is relatively less bright, the peak value G2 of the information volume thereof cannot be detected because the information volume of the image of the light point B is diluted by the information volumes of the other images of the light points A and C. In the case of a photographic camera, since most subjects to be photographed thereby are those of relatively high brightness, detection of the peak value of the contrast of those subjects by means of an electrical signal is sufficient.

Contrary to the prior art system wherein a relatively high component of spatial frequencies that represent the image of the target subject is picked up and is used as a signal indicating that the target subject is focused in the image plane, it is clear from FIG. 6 that numerous local focal planes, such as those including the conjugate plane $P_B$, in correspondence to the target subjects each having a depth are detected as peak values of a detected signal. Since a subject to be photographed is generally considered an aggregation of points of light of different brightness, the foregoing explanation may be equally applicable in a broad sense and, therefore, automatic focusing according to the prior art system often takes place subject to any of the local focal planes. This means that the operation of the prior art system is not reliable and that the practical availability is lowered.

According to the present invention, since the arrangement has been made to detect the highest value of the contrast of a portion of the image which is relatively bright, the focusing device can be advantageously employed in such a photographic camera as employed to take photographic pictures of target subjects of various light intensity distribution and having a depth.

Furthermore, according to the present invention, since the focusing device is made to assess the whole range of spatial frequency, the scanner having a unitary light receptor of a larger size than that heretofore considered the largest limit can be advantageously employed. More particularly, the following upper and lower limits have heretofore been considered existing in the size of the unitary light receptor. As regards the lower limit of the size of the unitary receptor, in the case of a measuring instrument wherein the video signal can be amplified by a photo-multiplier having a relatively high sensibility and having no limit on the time response characteristic, the unitary light receptor is made as small as possible in order that a relatively high component of the spatial frequencies is to be assessed and, therefore, the unitary light receptor, for example, a slit of $2\mu$ to $0.5\mu$ in width is practically used. However, when it comes to the focusing device for use in a photographic camera, partly because the focusing device should have a rapid time response characteristic and partly because it cannot afford the employment of the photo-multiplier and should meet requirements of easy manufacture at relatively low costs and reliable operation, the unitary light receptor of such a small size cannot be employed and, therefore, the acceptable size is limited to $20\mu$. On the other hand, as regards the upper limit, the size of the unitary light receptor depends on what component of the spatial frequency of an image is to be picked up from the video signal and, in the case of the prior art focusing system, it is limited to $50\mu$ by the reason as will be quantitatively described and the prior art focusing system does not satisfactorily function if the size of the unitary light receptor is more than $50\mu$.

In spite of the foregoing limits in the size of the unitary light receptor, it is believed that the use of the unitary light receptor of a size as large as possible is favored in view of the fact that the ratio of signal-to-noise of the output of the scanner can be increased to obtain a video signal of good signal-to-noise ratio. Nevertheless, for the reason hereinbefore described, the size of the unitary light receptor is limited and this limitation has been found to be one of the major causes that the prior art focusing system cannot be practically employed.

Referring to FIG. 4, if the size of the unitary light receptor of the scanner employed in the prior art focusing system is increased, the cut-off frequency fc which is a reciprocal of the size of the unitary light receptor will be reduced and, consequently, the level of the signal indicative of the focus setting which is picked up through the high pass filter D4 will be considerably lowered. Therefore, the unitary light receptor cannot be made larger than the upper limit.

On the other hand, in the focusing device of the present invention, as shown in FIG. 3, even if the size of the unitary light receptor is increased with the cut-off frequency being accordingly lowered to a value $fc'$, the optical transfer function available when the image is focused in the image plane merely varies from the curve C1 to a dotted curve C7 while relative variation of the curve C7 to the curve C2 and then to the curve C3 that takes place as the once focused image is brought out of focus does not change. Therefore, in the system of the present invention wherein variation of the area defined by each of the curves C7, C2 and C3 in cooperation with the axes of the abscissa and ordinate, i.e., the information volume, is detected, the detectability will not be reduced so far as a required spatial frequency range covers a relatively low spatial frequency.

A quantitative relationship between the spatial frequency to be assessed and the acceptable size of the unitary light receptor is as follows.

Referring to FIG. 8, it is assumed that a curve H1 represents an optical transfer function available when the image is focused in the image plane and that the curve H1 varies to a curve H2 and then to a curve H3 as the image is brought out of focus. If the focusing detectability of the objective lens assembly of a photographic camera is expressed by $\alpha$, the value of this detectability $\alpha$ is considered proportional to the product of the rate of decay of the optical transfer function (contrast) resulting from focus displacement and the absolute value of the optical transfer function (contrast).

In FIG. 8, assuming that fc is the cut-off frequency of the total optical transfer function, the value of the detectability is relatively high if the spatial frequency $f$ to be assessed is within the range of $3 fc/4 > f > fc/4$. If this range is converted in terms of the size $d$ of the unitary light receptor, the following relationship can be obtained:

$$3/(4.d) > f > 1/(4.d) \quad (1)$$

On the other hand, if the spatial frequency $f$ to be assessed is known, the size $d$ of the unitary light receptor that satisfies the formula (1) can be expressed as follows:

$$3/(4f) > d > 1/(4f) \quad (2)$$

Thus, the size of the unitary light receptor is defined by the formula (2). The relationship expressed by the formula (2) is illustrated in FIG. 9 wherein the axis of the ordinate represents the size of the unitary light receptor in terms of micron and the axis of the abscissa represents the spatial frequency $f$ to be assessed which is expressed in terms of lines per milimeter. From FIG. 9, it is clear that the value of the size $d$ of the unitary light receptor falls within a hatched area defined by curves l1 and l2. For comparison, the size of the unitary light receptor which is employed in the prior art focusing system and which falls within the range of from 20 to 50μ falls within an area defined by the curves l1 and l2 between dotted lines l3 and l4.

So far as the automatic focusing device particularly intended for use in a photographic camera is concerned, assessment of a relatively low component of the spatial frequency of the image, within the range of from 2 lines/mm. to 15 lines/mm. is sufficient to find the true focus setting in relation to the image and, therefore, the scanner employed in the automatic focusing device can have a plurality of unitary light receptors of a size within the range of from 50 to 150μ.

Because of the foregoing features, the automatic focusing device according to the present invention can function reliably and satisfactorily with a relatively high time response characteristic. Furthermore, the use of the unitary light receptors of a relatively large size provides a video signal of good signal-to-noise ratio and facilitates manufacture of the focusing device at relatively low costs and free of troubles.

BRIEF DESCRIPTION OF THE DRAWINGS

These and other objects and features of the present invention will become clear from the following description taken in conjunction with preferred embodiments thereof with reference to the accompanying drawings, in which;

FIG. 1 is a graph employed to explain an optical transfer function,

FIG. 2 is a diagram showing a sine wave of the spatial frequency and the size of a unitary light receptor, FIGS. 3a and 3b are graphs similar to FIG. 1, showing a total optical transfer function of the focusing device of the present invention as applied in a photographic camera, FIG. 4 is a graph showing a total optical transfer function and a high pass filter employed in the prior art automatic focusing device, FIG. 5 is a diagram showing how images of subjects to be photographed at different distances away from a lens are projected on respective image planes, FIGS. 6(a)–(c) are graphs showing optical transfer functions associated with the images on the image planes shown in FIG. 5, FIG. 7 is a graph showing the relationship between the information volume and the lens displacement that is taken from FIG. 5, FIG. 20 is a similar diagram to FIG. 10, showing a further embodiment of the present invention, FIG. 21 is a chart showing waveforms of various pulses employed in the arrangement of FIG. 20, FIG. 24 is a chart showing waveforms of various pulses employed in the arrangement of FIG. 23.

DETAILED DESCRIPTION OF THE INVENTION

Figure 8:
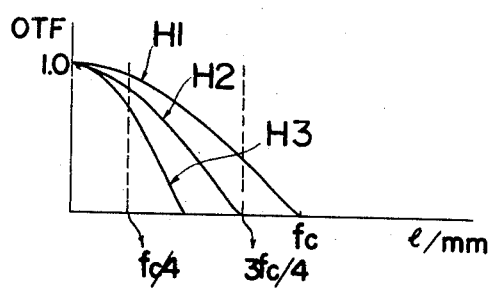
FIG. 8 is a graph showing the total optical transfer function and the range of spatial frequency which is employed in selecting the size of the unitary light receptor useable in the device of the present invention.

Before the description of the present invention proceeds, it should be noted that like parts are designated by like reference numerals throughout the accompanying drawings.

Figure 13:
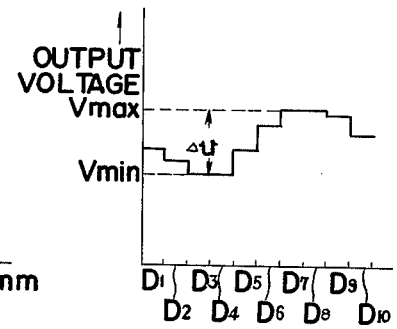
FIG. 13 is a diagram showing the waveform of a serial video signal emerging from the scanner when the image of the target subject is not properly focused.
Figure 14:
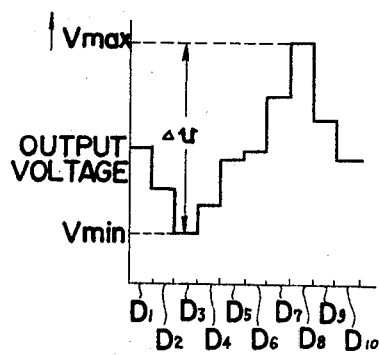
FIG. 14 is a diagram similar to FIG. 13, available when the image of the target subject is focused.
Figure 10:
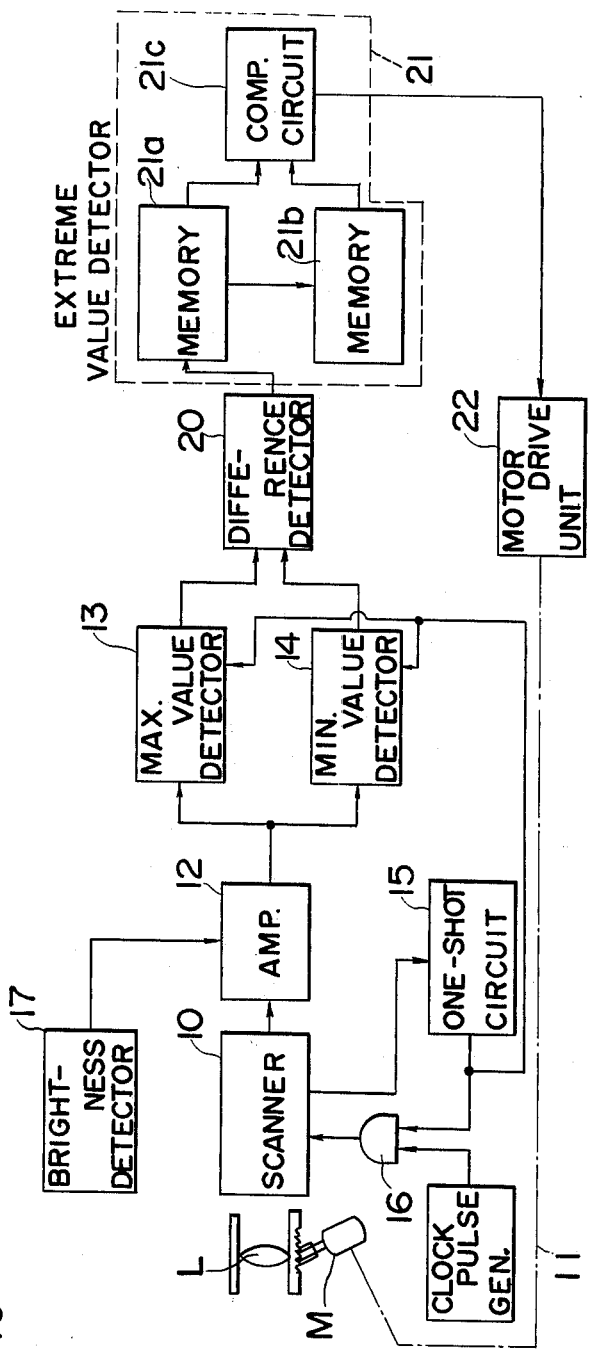
FIG. 10 is an electrical block diagram of the focusing device according to one embodiment of the present invention.

Referring first to FIG. 10, the automatic focusing device comprises a scanner 10 which converts a beam of light carrying an image of a target subject to be photographed into an electrical video signal of a waveform shown in either FIG. 13 or FIG. 14. The scanner 10 includes a multi-cell photo-transducer having a plurality of unitary light receptors and, in the illustrated embodiment, the multi-cell photo-transducer is employed in the form of a self-scanning photo-diode array 10a, shown in FIG. 11, having a plurality of photo-diodes $D_1, D_2 \ldots$ and $D_9$ and $D_{10}$ disposed in a linear arrangement.

Figure 12:
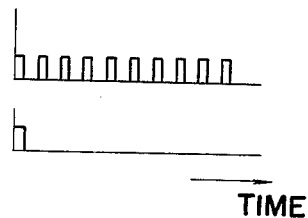
FIG. 12 is a diagram showing waveforms of clock pulses and a start pulse.

The self-scanning photo-diode array 10a may be any one commercially available and should be understood as including a built-in shift register which is triggered by clock pulses, as shown in FIG. 12, generated from a clock pulse generator 11, so as to sequentially bring the photo-diodes into operation, said built-in shift register being capable of generating a line end pulse indicative of the end of a scan, i.e., the sequence of operation of the photo-diodes. The details and operation of the photo-diode array may be available from a manufacturer's specification and are, therefore, omitted for the sake of brevity.

Figure 11:
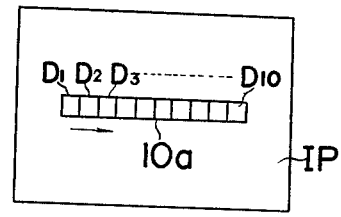
FIG. 11 is a schematic front view of a scanner employed in the present invention.
Figure 9:
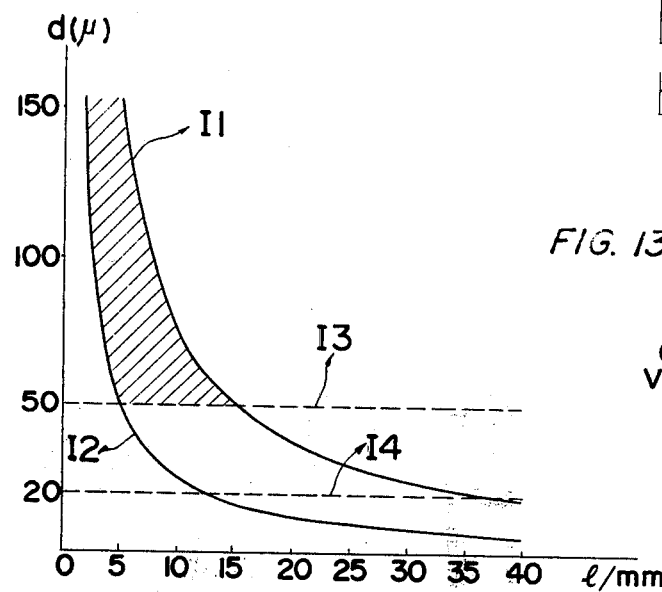
FIG. 9 is a graph showing the size of the unitary light receptor in relation to the spatial frequency assessed by the device of the present invention and that by the prior art focusing system.

It is, however, to be noted that, according to the present invention, the photo-diode array 10a should be arranged such as to permit the photo-diodes $D_1, D_2 \ldots D_9$ and $D_{10}$ to scan an image of a preselected area of the target subject that is formed in an image plane, schematically represented by IP in FIG. 11, through a lens assembly L. In practice, in case of a single reflex camera to which the focusing device of the present invention is applied, an incident beam of light carrying the image of the target subject that has passed through the objective lens assembly L is made to divert in part to a light sensitive film and in part to the scanner 10 and this technique is well known to those skilled in the art.

The serial video signal emerging from the scanner 10 upon completion of each scan may have a waveform as shown in FIG. 13 in the case where the image of the target subject is not correctly focused in the image plane, or as shown in FIG. 14 in the case where the same image of the target subject is focused in the same image plane. As can be understood from a comparision between FIGS. 13 and 14, a voltage difference $\Delta v$ between the maximum and minimum values of the serial video signal is greater when the image is focused than when the same image is not focused, due to the fact that the focused image gives a sharp contrast.

The serial video signal indicative of the image of the target subject is then fed to an amplifier 12 and then to a maximum value detector 13 and a minimum value detector 14.

One-shot circuit 15 generates a low level signal to an AND gate 16 to trigger the latter off to interrupt passage of clock pulses from the clock pulse generator 11 to the scanner 10. Generation of the low level signal from this one-shot circuit 15 takes place when the end pulse is fed from the scanner 10 to said circuit 15. Therefore, it is clear that the scanning operation of the scanner 10 is interrupted each time the AND gate 16 is triggered off upon receipt of the low level signal applied from the one-shot circuit 15.

A brightness detector 17 is electrically connected to the amplifier 12 for controlling the amplification degree of the amplifier 12 in response to the average level of brightness of the target subject which is detected thereby so that the level of output to be applied both to the maximum and minimum value detectors 13 and 14 from the amplifier 12 can be adjusted to meet the dynamic ranges of said detectors 13 and 14. This brightness detector 17 may not be provided and, also, the amplifier 12 may, if the serial video signal from the scanner 10 has a sufficient level, be omitted.

Figure 15:
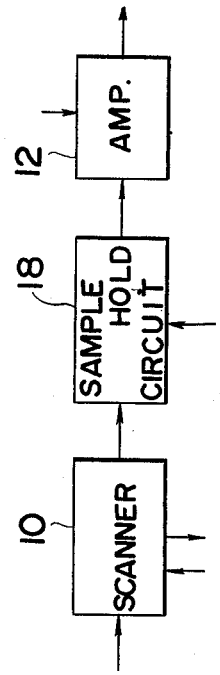
FIG. 15 is a block diagram of a portion of the focusing device according to another embodiment of the present invention, FIG. 16. is a diagram showing waveforms of sampling pulses employed in the arrangement of FIG. 15.
Figure 16:
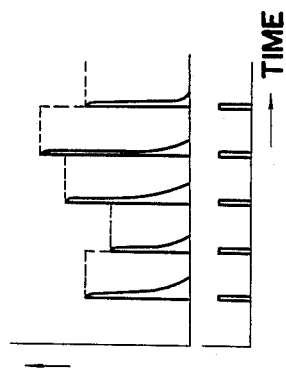

As shown in FIG. 15, a sample-and-hold circuit 18 may be inserted either between the scanner 10 and the amplifier 12 or between the amplifier 12 and the detectors 13 and 14. The employment of this sample-and-hold circuit 18 is recommended in the case where the multi-cell transducer for the scanner 10 is employed in the form of a current-operated image sensor which is also commercially available. The purpose of employment of the sample-and-hold circuit 18 is to enable a signal emerging from the scanner 10 of a waveform as shown in FIG. 16 to be substantially translated into a serial video signal of a waveform similar to that of the serial video signal available from the photodiode array.

Figure 17:
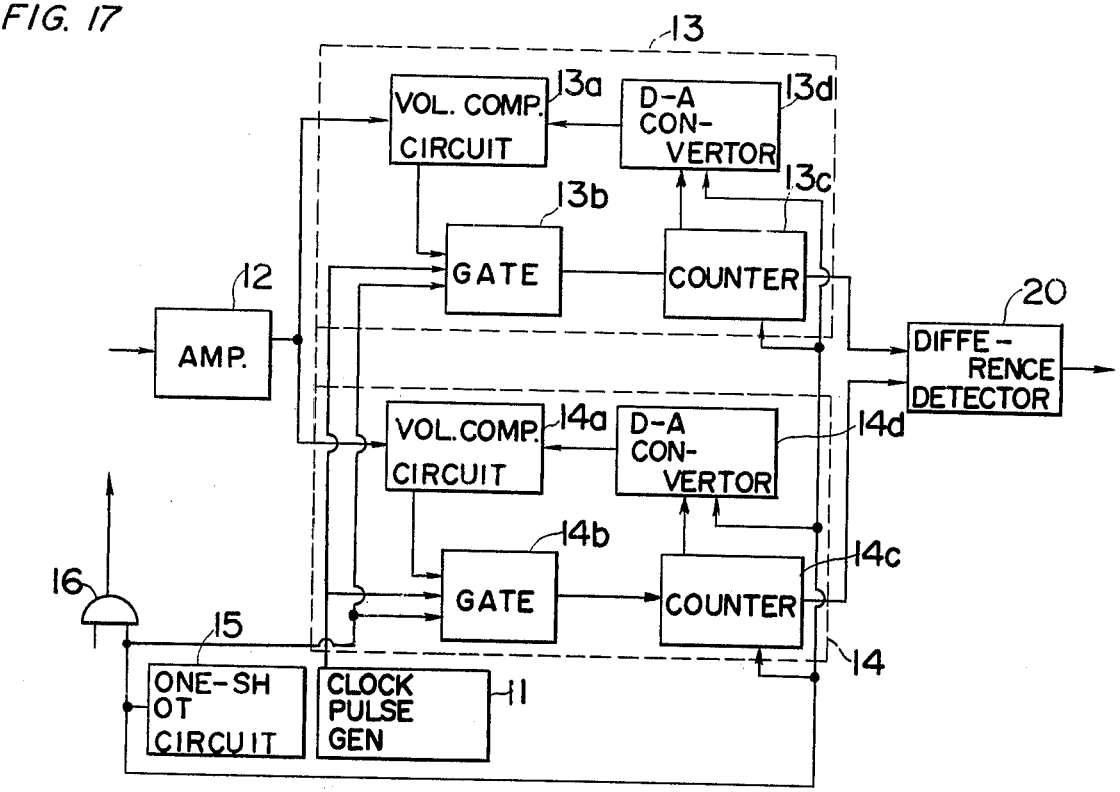
FIG. 17 is a block diagram showing the details of maximum and minimum value detectors shown in FIG. 10.

Referring to FIG. 17, wherein the details of each of the maximum and minimum value detectors 13 and 14 are shown, both of the detectors 13 and 14 may be a known analogue-digital converter of feedback type and includes a voltage comparison circuit 13a and 14a, a gating circuit 13b and 14b, a binary counter 13c and 14c and a digital-analogue converter 13d and 14d, the latter being essentially composed of a network of resistors.

In the maximum value detector 13, the voltage comparison circuit 13a has a pair of input terminals; one connected to the scanner 10 through the amplifier 12 and the other connected to the digital-analogue converter 13d. This comparison circuit 13a acts to compare the level of voltage of the serial video signal from the scanner 10 with the level of voltage of an analogue signal from the converter 13d and to generate an output signal to the gating circuit 13b only when the voltage level of the serial video signal exceeds the voltage level of the analogue signal. It is to be noted that the voltage level of the analogue signal from the D-A converter 13d stepwisely increases in response to each pulse applied thereto from the gating circuit 13b in a manner as will now be described.

The gating circuit 13b has three input terminals respectively connected to the voltage comparison circuit 13a, another clock pulse generator 11' and the one-shot circuit 15 and is capable of permitting passage of one or more clock pulses therethrough to the counter 13c when all the input terminals of said gating circuit 13b receive respective inputs and so long as the voltage level of each component of the serial video signal from the scanner 10 exceeds the voltage level of the analogue signal.

Pulses emerging from the gate 13b are fed to the counter13c. The pulses thus fed to the counter 13c are counted by the counter 13c and stored therein until the counter 13c receives a reset pulse which is an output from the one-shot circuit 15. The D-A converter 13d generates an analogue signal, the voltage of which analogue signal increases in response to the number of the pulses counted by the counter 13c.

So far as the maximum value detector 13 is concerned, it has now become clear that, only the highest component of the serial video signal from the scanner 10 is converted into a digital signal which emerges from the counter 13c indicative of the number of the pulses counted thereby.

The minimum value detector 14 having the similar circuit components and arrangement to the maximum value detector 13 functions in a substantially reverse manner. In other words, during operation of the circuit arrangement and during a period in which no serial video signal is applied to any of the detectors 13 and 14, both the converters 13d and 14d generate analogue signals of the same initial preset value. While the preset value of the converter 13d increases in response to the number of pulses received thereby in the manner as hereinbefore described, the preset value of the converter 14d decreases in a manner as will now be described, but in a substantially reverse manner.

Assuming now that a component of the serial video signal is applied simultaneously to the voltage comparison circuits 13a and 14a, if this serial video signal component has a voltage level higher than the preset value of each of the D-A converters 13d and 14d, only the voltage comparison circuit 13a of the maximum value detector 13 generates its output to the gating circuit 13b while no output is applied to the gating circuit 14b from the voltage comparison circuit 14a of the minimum value detector 14. However, when any one of the other components of the serial video signal having a voltage level lower than the preset value of the D-A converter 14d which has remained the same, but which is lower than the preset value of the D-A converter 13d that has already been increased, the voltage comparison circuit 14a of the minimum value detector 14 generates its output to the gating circuit 14b. The gating circuit 14b functions in the same way as the gating circuit 13b and is adapted to pass clock pulses therethrough to the counter 14c.

The D-A converter 14d functions in a substantially similar manner as the converter 13d, but differs from said converter 13d in that the voltage value of an output from the converter 14d stepwisely decreases in response to the number of pulses fed thereto from the gating circuit 14b.

Both the counters 13c and 14c generate digital signals therefrom to a difference detector 20 and the contents that have respectively been stored in said counters 13c and 14c are zeroed, when each scanning operation of the scanner 10 is completed. This is possible because, each time the image of the target subject is scanned by the scanner 10, the end pulse indicative of the end of the scan is generated from the scanner 10 which is applied to the one-shot circuit 15. The one-shot circuit 15 upon receipt of the line end pulse generates a low level signal which acts on the AND gate 16 to trigger the latter off and also acts, as the reset pulse, on the counters 13c and 14c to reset the latter.

Simultaneously with the zeroing of the content that has been stored in each of the counters 13c and 14c, the D-A converters 13d and 14d receive the same reset pulse which acts on these converters 13d and 14d to reset the respective voltage levels, that have been diverted from each other, to the same initial preset value in readiness for processing of the components of a serial video signal subsequently fed from the scanner 10 during another cycle of scanning.

It should be noted that, each of the voltage comparison circuits 13a and 14a is designed so as to generate its output to the corresponding gating circuit 13b or 14b in the form of a train of pulses, and the employment of the clock pulse generator 11' and its associated lines or wirings may be omitted.

The digital signals fed from the maximum and minimum value detectors 13 and 14 to the difference detector 20 are processed in such a manner that subtraction is subjected to the numbers of pulses respectively represented by the digital signals fed from the detectors 13 and 14. Therefore, it is clear that output signal from the difference detector 20 indicates the difference between the number of pulses counted by the counter 13c and that by the counter 14c. In other words, the difference between the highest and lowest voltage levels of the serial video signal emerging from the scanner 10 upon completion of each scanning operation is expressed in terms of the difference between the number of pulses counted by the counter 13c and that by the counter 14c which is represented by the output signal generated from the detector 20.

Referring back to FIG. 10, it is clear that the output signal from the difference detector 20 is then fed to an extreme value detector 21 of an arrangement as will be described. However, it should be noted that, simultaneously with the application of the output signal to the extreme value detector 21, the objective lens assembly L is axially moved in predetermined incremental displacements one at a time in one direction and, thereafter, resetting of the binary counters 13c and 14c takes place in readiness for the next scan of the image of the same target subject appearing in the image plane IP.

The extreme value detector 21 includes a first memory 21a having an input terminal connected to the difference detector 20, a second memory 21b having an input terminal connected to the first memory 21b and a comparison circuit 21c having input terminals connected to respective output terminals of the first and second memories 21a and 21b and an output terminal connected to a motor drive circuit 22.

The extreme value detector 21 operates in the following manner. When an output signal is fed to the first memory 21a, a content that has been stored in the memory 21a, which is associated with the previous scanning operation of the scanner 10, is transferred to and temporarily stored in the second memory 21b and, thereafter, the contents stored in the respective memories 21a and 21b are compared by the comparison circuit 21c, output of which comparison circuit 21c is indicative of the difference between these contents that have been stored in said first and second memories 21a and 21b. The output from the comparison circuit 21c is in turn utilized to control a driving mode of the lens drive motor M in a manner as will be described later with reference to FIG. 18.

The comparison circuit 21c is designed such that its output will be a high level signal if the value of the content stored in the first memory 21a is higher than or equal to that in the second memory 21b and be a low level signal if the content stored in the second memory 21b is higher than that in the first memory 21a. The high level signal emerging from the comparison circuit 21c is utilized to drive the lens assembly L in the same axial direction as it has previously been moved in search of the true focus setting and the low level signal emerging therefrom is used to interrupt the axial movement of the lens assembly L or to drive the same in the opposite direction.

Accordingly, as will become clear from the subsequent description, so long as no electric power is supplied to the motor M, the comparison on circuit 21c of the extreme value detector 21 generates the high level signal.

Figure 18:
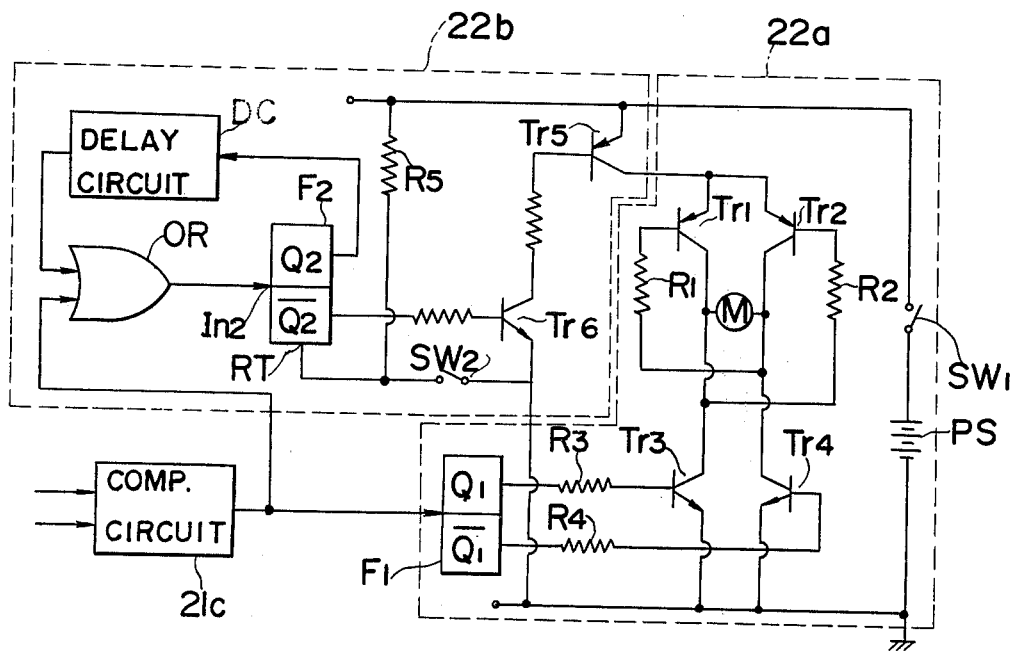
FIG. 18 is a circuit diagram showing a motor drive circuit shown in FIG. 10.

An output signal from the comparison circuit 21c is subsequently fed to a motor drive unit 22, the details of which are illustrated in FIG. 18 and, therefore, reference will now be made to FIG. 18.

The motor drive unit 22 includes a drive circuit 22a and a motor control 22b. The drive circuit 22a includes switching transistors Tr1, Tr2, Tr3 and Tr4 and resistors R1, R2, R3 and R4 and is used to drive the motor M, which is inserted between collectors of the respective transistors Tr1 and Tr2. This drive circuit 22a *a*further includes a flip-flop F1 having a pair of output terminals Q1 and $\overline{Q1}$ and operable in such a manner that, only when the state of the output signal from the comparison circuit 21c changes from high level to low level, the states of respective output signals from the flip-flop F1 are inverted with respect to each other. However, it is uncertain whether output from any one of the output terminals Q1 and $\overline{Q1}$ is in the high level state at the time when the circuit is energized.

The motor control 22b includes a pair of switching transistors Tr5 and Tr6, a delay circuit DC substantially composed of a known time constant circuit, an OR circuit OR and a flip-flop F2 having output terminals Q2 and $\overline{Q2}$. This motor control 22b acts to interrupt the operation of the motor M to stop the movement of the lens assembly L when the image of the target subject is correctly focused in the image plane IP.

A normally opened reset switch SW2 forms a reset circuit for the flip-flop F2 and, so long as this reset switch Sw2 is opened, a high level reset signal can be applied to a reset terminal, as at RT, of the flip-flop F2 so that the flip-flop F2 is brought in position to invert the states of respective outputs to be emerged from the output terminals Q2 and $\overline{Q2}$. However, when the reset switch Sw2 is instantaneously closed, the state of output $\overline{Q2}$ of the flip-flop F2 becomes high level.

The delay circuit DC acts to delay for a predetermined time the timing at which the state of output Q2 of the flip-flop F2 is inverted.

Operation of the motor drive unit 22 is as follows. Assuming that a power supply switch Sw1, connected with a power source PS is closed, the flip-flop F2 generates a low level signal from its output terminal $\overline{Q2}$ so long as the reset switch SW2 is not instantaneously operated. During this condition, the transistor Tr6 is switched off and, accordingly, the transistor Tr5 is switched off. Therefore, no electric power is supplied to the motor M. It is to be noted that the flip-flop F1 generates a high level signal from its output terminal Q1.

When the reset switch SW2 is instantaneously closed after a photographer has determined what to be photographed and subsequently held his camera so as to direct the lens assembly L towards the target subject, the output $\overline{Q2}$ of the flip-flop F2 becomes high level whereby the transistors Tr6 and Tr5 are respectively sequentially switched on. Therefore, the motor M is energized to move the lens assembly L in one direction. At this time, the switching transistors Tr2 and Tr3 are conducting and current flows through the motor M from the collector side of the transistor Tr2 to the collector side of the transistor Tr3.

Simultaneously with the instantaneous closure of the reset switch SW2, the output Q2 of the flip-flop F2 becomes low level, transfer of this low level signal from the flip-flop F2 to the OR circuit OR being delayed by the delay circuit DC for a predetermined time which is selected in a manner as will become clear from the subsequent description.

As hereinbefore described, so long as the movement of the lens assembly L is interrupted, the output from the comparison circuit 21c is in the state of high level. However, there will be a possibility that the output from the comparison circuit 21c becomes low level after subsequent movement of the lens assembly L by the operation of the motor M which means that the lens assembly L has been moved in such a direction that the image of the target subject is more and more blurred. To avoid stoppage of the operation of the motor M at the time the state of output from the comparison circuit 21c changes from high level to low level, the delay circuit DC and the circuit OR are employed.

When the input applied to the flip-flop F2 through a terminal $In_2$ falls from the high level state to the low level state, the states of outputs Q2 and $\overline{Q2}$ are inverted. Furthermore, at the time the lens assembly L has been moved in such a direction that the image of the target subject is nearly focused in the image plane, the output of the comparison circuit 21c varies from the high level state to the low level state and this variation can be detected by the flip-flop F2 to interrupt supply of the electric power to the motor M.

It is to be noted that if the delay circuit DC and the OR circuit OR are not provided in the circuit, the flip-flop F2 also detects a similar variation of the state of output of the comparison circuit 21c which may take place at the initiation of the operation of the motor M. Therefore, the period during which the signal to be fed from the flip-flop F2 to the circuit OR is delayed by the delay circuit DC should be selected such as to correspond to a period of time required between the initiation of each operation of the motor M and the generation of a subsequent output signal from the comparison circuit 21c which takes place after such operation of the motor M has been effected.

From the foregoing, it is clear that the comparison circuit 21c continues to generate a low level signal if the direction of stepwise movement of the lens assembly L is opposed to the true focus setting. However, since the output from the comparison circuit 21c which is generated during intermittence of the lens assembly L prior to initiation of the operation of the motor M is in the high level state, the flip-flop F1 is inverted to generate a high level signal from the output terminal $\overline{Q1}$ so that the transistors Tr1 and Tr4 start conducting. Upon conduction of these transistors Tr1 and Tr4, current flows through the motor M from the collector side of the transistor Tr1 to the collector side of the transistor Tr4, thus reversing the motor M whereby the lens assembly L is moved in a direction in search of the true focus setting. Once the lens assembly L is stepwisely moved in the direction in search of the true focus setting, the output from the comparison circuit 21c is in the high level state.

It should be noted that any of the flip-flops F1 and F2 is not inverted when the output from the comparison circuit 21c varies from the low level state to the high level state.

If the lens assembly L moving in the direction in search of the true focus setting is further moved beyond the true focus setting, the output from the comparison circuit 21C then becomes a low level signal which is in turn applied to the input terminal $In_2$ of the flip-flop F2 through the circuit OR whereby the output $\overline{Q2}$ of the flip-flop F2 is inverted from the high level state to the low level state. Accordingly, the transistor Tr5 is switched off to interrupt the supply of electrical power to the motor M.

On the other hand, at the time the output $\overline{Q2}$ of the flip-flop F2 is inverted to the low level state, the output Q2 thereof is inverted from the low level state to the high level state. However, because of the delay circuit DC, an high level signal is applied to the circuit OR delayed the predetermined time after it has been received by said delay circuit DC. Thus, the search of the true focus setting is completed at the time the operation of the motor M ceases.

The foregoing process will be repeated if the reset switch SW2 is again instantaneously closed which may be effected when a different target subject is, for example, desired to be photographed. In such case, if the output from the comparison circuit 21c is a high level at the time of initiation of the operation of the motor M resulting from re-closure of the reset switch SW2, the motor M continues to move stepwise the lens assembly L until the output of the comparison circuit 21C becomes a low level.

In the case where the motor drive unit 22 is not provided with the motor control 22b of the foregoing arrangement, it will be understood that the motor M is operated so as to move the lens assembly L only in one direction in search of the true focus setting.

That is to say, the flip-flop F1 is inverted each time the output from the comparison circuit 21c varies from the high level state to the low level state and, therefore, the motor M operates so as to move the lens assembly in only one direction in search of the true focus setting.

Figure 19:
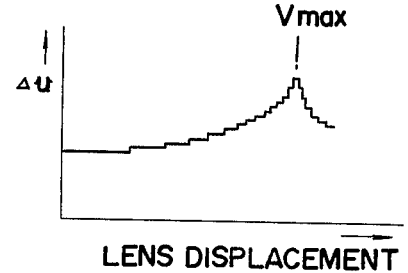
FIG. 19 is a graph showing a relationship between a detected voltage difference and lens displacements.

From the foregoing it has now become clear that the relationship of the displacement of the lens assembly L relative to the voltage difference between the maximum and minimum values of the serial video signal describes a graph as illustrated in FIG. 19. If this voltage difference attains an extreme value, indication is made that the image of the target subject has been focused in the image plane.

In the embodiment shown in FIG. 20, a selection circuit 23 is provided for controlling the operation of each of the maximum and minimum value detectors 13 and 14 so that some of the components of the serial video signal generated each time the scanner 10 scans the image of the target subject can be processed to render the focusing operation to be carried out in relation to a selected area of the image of the target subject.

It will recognized that every target subject to be photographed has depth. By way of example, in the case where a target subject is standing with beautiful mountains behind the target subject and such a scene including the target subject and the mountains is covered within the field of view of a photographic camera, some of the photo-diodes of the diode array (FIG. 11) will scan parts of the scene except for the target subject and the others thereof will scan the target subject. In such case, the photographic camera, because of being incapable of making a decision on its own, cannot determine at what the photographer intends to aim. The selection circuit is provided for substantially eliminating the above disadvantage.

Hereinafter, the details of the selection circuit 23 will be described and it is, however, noted that the photo-diode array forming a part of the scanner 10 and employed in this embodiment should be understood as having 16 photo-diodes as designated by $d_1, d_2 \ldots d_{15}$ and $d_{16}$ though the number thereof is not limited thereby.

Referring now to FIG. 20, the selection circuit 23 includes first and second delay circuits 23a and 23b and an AND gate AND, and output of which gate AND is connected to both of the gating circuits 13b and 14b (FIG. 17) of the maximum and minimum value detectors 13 and 14.

Each of the delay circuits 23a and 23b has a pair of input terminals respectively connected to the clock pulse generator 11 and the one-shot circuit 15 and an output terminal connected to the gate AND. As shown in FIG. 21, the one-shot circuit 15 generates a high level signal in response to the start of the scan of the scanner 10 and a low level signal in response to the end of the scan thereof.

While clock pulses are continuously supplied to the delay circuits 23a and 23b, the delay circuit 23a upon receipt of the high level signal fed from the one-shot circuit 15 and the clock pulses generates an inverted output pulse of a predetermined duration and the delay circuit 23b upon receipt of the high level signal from the one-shot circuit 15 and the clock pulses generates an output pulse of a predetermined duration which is larger than the predetermined duration of the inverted output pulse, as shown in FIG. 21.

Both of the output pulses from the delay circuits 23a and 23b are simultaneously applied to the input terminals of the gate AND and, consequently, it is clear that the gate AND generates an output signal of a duration substantially equal to the difference between the respective durations of the output pulses from the delay circuits 23a and 23b.

Accordingly, the gating circuits 13b and 14b (FIG. 17) of the maximum and minimum value detectors 13 and 14 are triggered on only during a period of time substantially equal to the duration of the output signal from the gate AND which corresponds to the sum of duration of components of the serial video signal that are associated with the photo-diodes $d_5$ to $d_{12}$.

In other words, assuming that the scanning operation of the scanner 10 commences at the time $t_1$ and ends at the time $t_4$, only that portion of the serial video signal which corresponds to the outputs from the photo-diodes $d_5$ to $d_{12}$ and which appears during a period between times $t_2$ to $t_3$, is processed to enable the counters 13c or 14c to count the number of pulses fed thereto during the duration of that portion of the serial video signal.

In practice, each of the first and second delay circuits 23a and 23b essentially composed of a pulse counting circuit which may be in the form of either a digital instrument or an analogue instrument including a capacitor capable of charging voltage of a predetermined value in response to each pulse applied thereto. Alternatively, each of the delay circuits 23a and 23b may be in the form of a monostable multivibrator, in which case the frequency of the clock pulse should be fixed.

Furthermore, although not shown, one or both of the delay circuits 23a and 23b may be provided with means for adjusting the duration of the output pulse emerging therefrom.

In the foregoing embodiments, the photo-diode array has been described as having the photo-diodes arranged in a line. A photo-diode array having the photo-diodes arranged in a matrix, such as shown in FIG. 22, is equally applicable to any of the foregoing embodiments except for the embodiment of FIG. 20 though not impossible.

Figure 23:
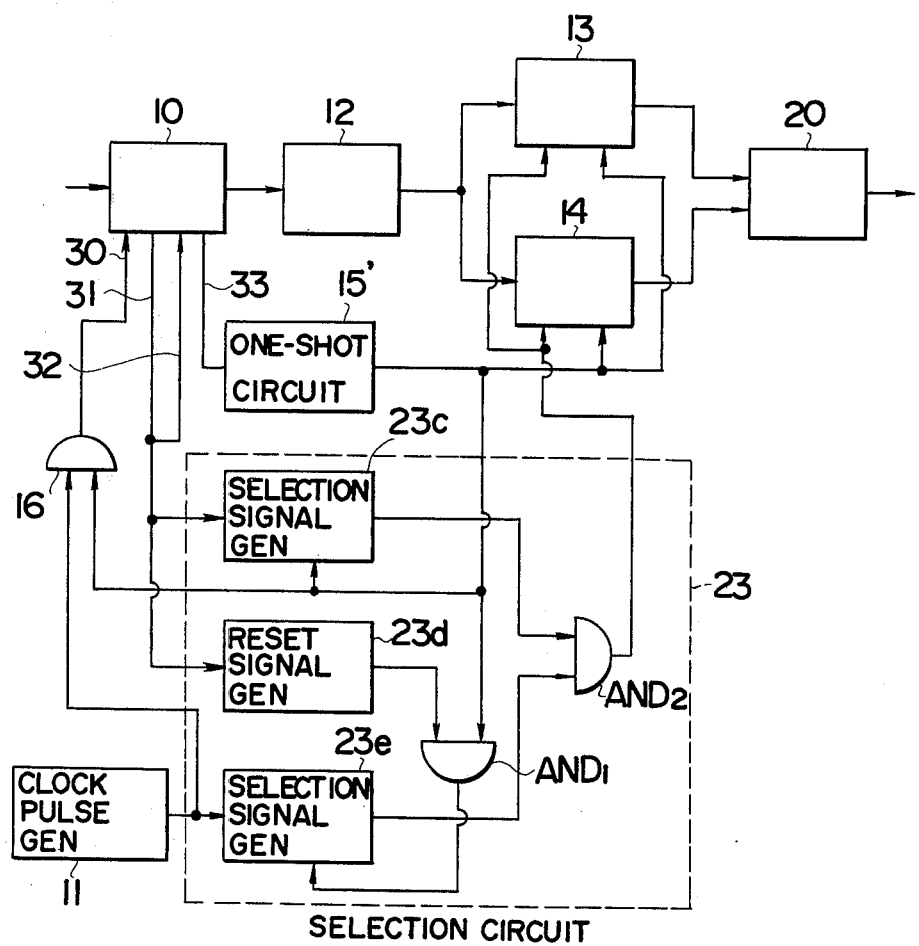
FIG. 23 is a block diagram of a portion of the focusing device according to a still further embodiment of the present invention wherein the scanner of FIG. 22 is employed.

The arrangement of FIG. 23 wherein the scanner 10 employs the photo-diode array having the photo-diodes arranged in a matrix, which array is generally referred to as "two dimensional or area array", is advantageous in that a portion of the serial video signal corresponding to an isolated portion of the image of the target subject can be processed in search of the true focus setting. This can be achieved merely be modifying the selection circuit 23 of FIG. 20 so as to cooperate with the area array 10b.

Before the details of the selection circuit 23 are described with reference to FIG. 23, a brief operation of the area array 10b will now be described.

Figure 22:
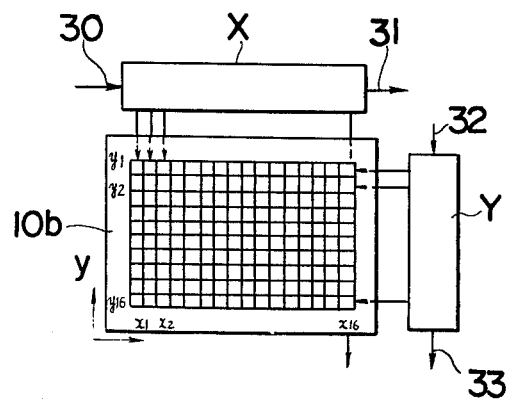
FIG. 22 is a schematic front view of another scanner useable in the present invention.

Referring to FIG. 22, the photo-diodes of the area array 10b are arranged side by side in a plurality of rows $y_1$, $y_2$ . . . $y_9$ and $y_{10}$ and orders or columns $x_1$, $x_2$ . . . $x_{15}$ and $x_{16}$.

If the clock pulse is applied to a shift register X through a line 30, the line shift register X operates so as to sequentially bring the photo-diodes of each column into operation and generates through a line 31 a line end pulse indicative of the end of a scan. A shift register Y acts to sequentially switch the rows of the photo-diodes in response to application of a pulse thereto through a line 32, which is generated in response to generation of the line end pulse from the shift register X and generates through a line 33 a frame end pulse after the last element of the photo-diodes in the last row $y_{10}$ has been brought into operation.

This area array is commercially available and, therefore, the details thereof are herein omitted.

Referring now to FIG. 23, the selection circuit 23 includes a first selection signal generator 23c, a reset signal generator 23d, a second selection signal generator 23e and a pair of AND gates $AND_1$ and $AND_2$.

The selection signal generator 23c has a pair of input terminals respectively connected to the line 31 and to the one-shot circuit 15' and an output terminal connected to one input terminal of the gate $AND_2$. The other selection signal generator 23e has a pair of input terminals respectively connected to the clock pulse generator 11 and to an output terminal of the gate $AND_1$ and an output terminal connected to another input terminal of the gate $AND_2$. The gate $AND_1$ has a pair of input terminals respectively connected to the line 31 through the reset signal generator 23d and to the one-shot circuit 15'. An output terminal of the gate $AND_2$ is connected to both of the gating circuits 13b and 14b (FIG. 17) of the maximum and minimum value detectors 13 and 14.

It should be noted that the one-shot circuit employed in the embodiment of FIG. 23 is designed such as to generate a low level signal in response to application of the frame end pulse fed thereto through the line 33.

In operation, assuming that one-shot circuit 15' generates the high level signal during the scanning operation of the scanner 10, the clock pulses are applied to the shift register X through the gate 16 then triggered on and, on the other hand, the binary counters 13c and 14c (FIG. 17) of the detectors 13 and 14 are in the process of counting in the manner as hereinbefore described. While the high level signal is applied to the gate $AND_1$, the reset signal generator 23d is, each time the line end pulse of a waveform as shown in FIG. 24 is applied thereto via the line 31 during the duration of the high level signal from the one-shot circuit 15', reset to generate a high level signal to the gate $AND_1$ whereby the latter is triggered on to pass a reset pulse to the selection signal generator 23e. The selection signal generator 23e upon receipt of each of the reset pulses commences to count the number of clock pulses applied thereto from the generator 11 and, after a predetermined number of the clock pulses has been counted, generates pulses of a predetermined duration as shown in FIG. 24, the number of which pulses generated thereby during the duration of the high level signal from the one-shot circuit 15' is substantially equal to the number of the line end pulses generated during each scanning operation of the scanner 10, said pulses from said generator 23e being fed to the gate $AND_2$.

On the other hand, each line end pulse from the shift register X is applied in part to the shift register Y through the line 32 and in part to the selection signal generator 23c. The selection signal generator 23c upon receipt of each line end pulse generates a pulse of a duration as shown in FIG. 24, which is in turn applied to the gate $AND_2$.

Therefore, upon receipt of both the pulse from the genertor 23c and that from the generator 23e, the gate $AND_2$ generates a train of pulses, as shown in FIG. 24, which correspond to the some of the pulses from the generator 23e that fall within the duration of the pulse from the generator 23c. The pulse train from the gate $AND_2$ is applied both to the gating circuit 13b and to the gating circuit 14b.

Consequently, either of the counters 13c and 14c operates in such a manner as to count the number of pulses fed from the gating circuit 13b or 14b during the duration of each pulse of the pulse train fed from the gate $AND_2$.

If the frame end pulse is subsequently applied to the one-shot circuit 15' upon completion of the scanning operation of the scanner 10, the one-shot circuit 15' generates the low level signal, the gate 16 is triggered off and the selection signal generator 23c is reset in readiness for the next operation. The counters 13c and 14c are also reset to transfer their contents to the difference detector 20.

Figure 25:
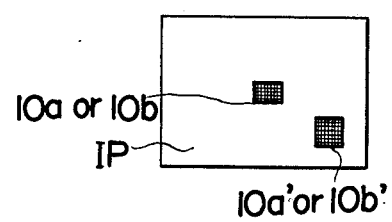
FIG. 25 is a schematic diagram showing the position of light receptors in an image plane.

Without employment of the selection circuit 23, it is possible to carry out a focusing operation in relation to a selected area of the image of the target subject. In order to achieve this, the photo-diode array 10a or the area array 10b should be made small and so sized as to scan the selected area of said image of said target subject. Preferably, means is provided for varying the position of the array 10a or 10b relative to the image plane IP, such as shown in FIG. 25, to provide a choice of determination of the selected area, for example, from a substantially central portion of the image plane IP to any one of the corners of the image plane IP as indicated by 10a' or 10b'.

According to the present invention, the focusing device functions satisfactorily without the maximum and minimum detectors 13 and 14. This will now be described with reference to FIGS. 26 and 27.

Figure 26:
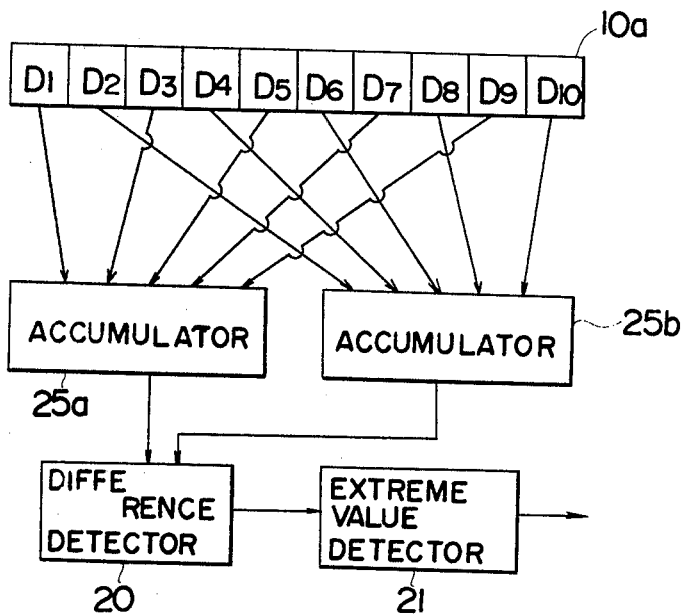
FIG. 26 is a block diagram showing a still further embodiment of the present invention.
Figure 27:
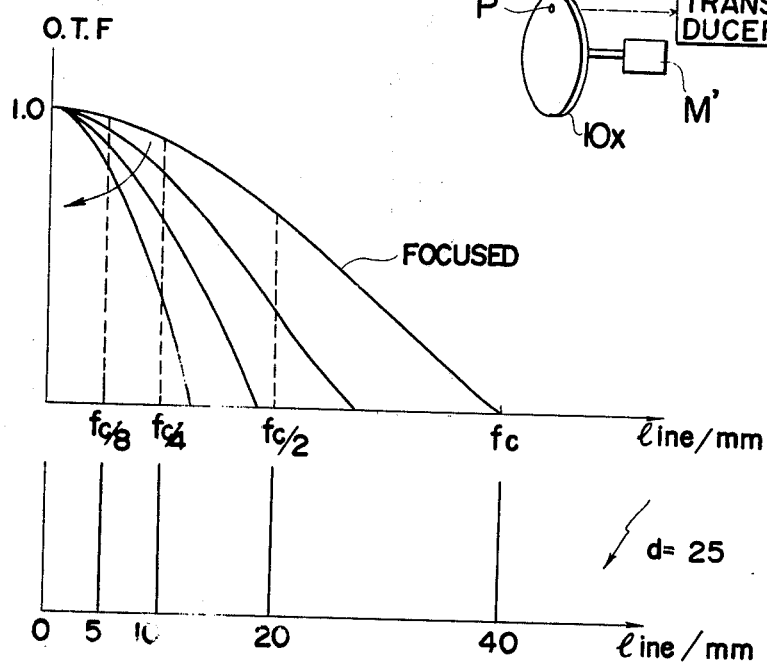
FIG. 27 is a graph showing an optical transfer function of the arrangement of FIG. 26.

Referring now to FIG. 26, the photo-diodes $D_1$, $D_2$ . . . $D_9$ and $D_{10}$ of the photo-diode array 10a are connected to first and second accumulators 25a and 25b alternately. That is, the photo-diodes that are referenced by odd-numbered reference characters are connected to the first accumulator while those by even-numbered reference characters are connected to the second accumulator. Each of the first and second accumulators 25a and 25b acts to add related component outputs of the serial video signal that are associated with the photo-diodes $D_1$, $D_3$, $D_5$, $D_7$ and $D_9$ or $D_2$, $D_4$, $D_6$, $D_8$ and $D_{10}$, and feed a digital signal indicative of the sum of the component outputs of the serial video signal to the difference detector 20. It should be noted that the output from the difference detector 20 corresponds to an output indicative of a relatively low component of the spatial frequency of the image scanned which is substantially equal to $fc/n$, wherein $fc$ is a cut-off frequency and n is an even integer and, in case of the illustrated embodiment of FIG. 26, is 2, said cut-off frequency being determined by an equation, $fc = 1/d$, wherein $d$ is the size of each of the photo-diodes of the diode araay 10a, as shown in FIG. 27.

Accordingly, it is clear that, when the output from the difference detector 20 attains an extreme value, it can be found that the true focus setting has been achieved.

It should be noted that the photo-diodes of the photo-diode array 10a may be connected to the accumulators 25a and 25b at intervals of every two or three or more photo-diodes, in which cases $n$ should be understood as being 4 or 6 or more, respectively.

Figure 28:
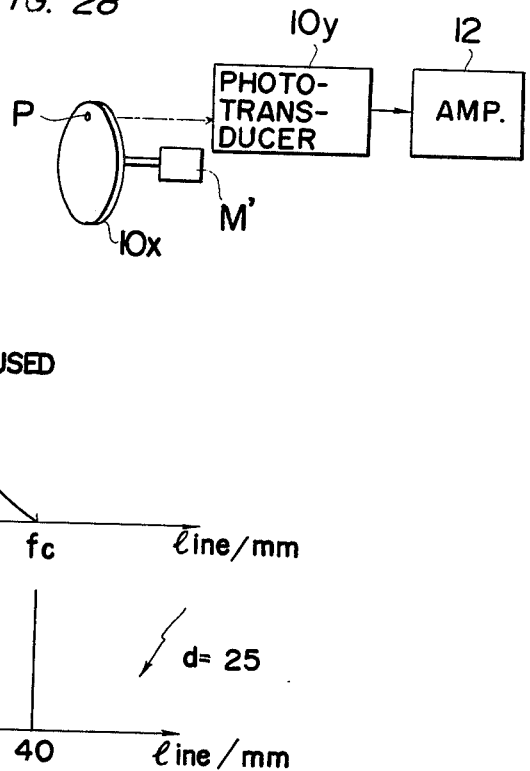
FIG. 28 is a schematic diagram showing an interceptor employable in the present invention.

FIG. 28 illustrates an example wherein the scanner comprises a rotatable disc 10x having a pin hole P and a photo-transducer 10y which is connected both to the maximum value detector 13 and to the minimum value detector 14 through the amplifier 12. The rotatable disc 10x can be rotated in one direction by a motor M'.

The arrangement of FIG. 28 is well known to those skilled in the art and this known arrangement can be employed in the present invention. However, it should be noted that the diameter of the pin hole P should be selected such as described hereinbefore. Furthermore, the pin hole P may be replaced by a suitable slit.

Although the present invention has been fully described by way of the preferred embodiment thereof, it should be noted that various changes and modifications are apparent to those skilled in the art. By way of example, instead of utilizing the output signal from the one-shot circuit 15 or 15', the line end pulse in the case of the embodiments except for that shown in FIG. 24 or the frame end pulse in the case of the embodiment of FIG. 24 may be employed to reset the counters 13c and 14c. These changes and modifications apparent to those skilled in the art should, unless they otherwise depart from the true scope of the present invention, be understood as included therein.

What is claimed is:

1. An apparatus for automatically focusing an image of a subject in an image plane, which is used for a photographic or television camera having an objective lens system, said apparatus comprising:
   means for moving said lens system in predetermined incremental displacements;
   a self-scanning photodiode array having a plurality of photodiodes arranged in said image plane so as to respectively generate an output corresponding to the brightness of a different part of the image;
   shift registering means connected to said photodiodes for repeatedly picking up the outputs of said photodiodes in a predetermined order to generate a first electric signal representative of distribution of the brightness of the image of a predetermined range of spatial frequencies during each picking-up cycle thereof;
   first detecting means for detecting maximum and minimum values of said first electric signal for each picking-up cycle of said shift registering means;
   means for generating a second electric signal representative of the difference between said maximum and minimum values of said first electric signals which have been detected by said first detecting means for a series of picking-up cycles of said shift registering means, said second electric signal varying in its value in accordance with the position of said lens system; and
   second detecting means for detecting the maximum value of said second electric signal for thereby indicating that said image is focused in said image plane thereof.

2. The apparatus as set forth in claim 1, wherein said first detecting means includes an analogue-digital converter means for generating digital signals respectively corresponding to said maximum and minimum values of said first electric signal, and said generating means comprises a difference detector means for detecting said digital signals to generate said second electric signal.

3. An apparatus for automatically focusing an image of a subject in an image plane, which is used for a photographic or television camera having an objective lens system, said apparatus comprising;
   means for moving said lens system in predetermined incremental displacements;
   a self-scanning photodiode array having a plurality of photodiodes arranged in said image plane so as to respectively generate an output corresponding to the brightness of a different part of the image;
   shift registering means connected to said photodiodes for repeatedly picking up the outputs of said photodiodes in a predetermined order to generate a first electric signal representative of distribution of the image of a predetermined range of spatial frequencies during each picking-up cycle thereof;
   first detecting means for detecting the maximum value of said first electric signal for each picking-up cycle of said shift registering means;
   means for generating a second electric signal representative of the maximum value of said first electric signals detected by said first detecting means for a series of picking-up cycles of said shift registering means, said second electric signal varying in its value in accordance with the position of said lens system; and
   second detecting means for detecting the maximum value of said second electric signal for thereby indicating that said image is focused in said image plane thereof.

4. The apparatus as set forth in claim 3, wherein said first detecting means includes an analogue-digital converter means for generating digital signals respectively corresponding to said maximum value of said first electric signal, and said generating means comprises a difference detector means for detecting said digital signals to generate said second electric signal.

* * * * *